United States Patent [19]
Henein

[11] Patent Number: 5,702,736
[45] Date of Patent: Dec. 30, 1997

[54] ASSEMBLY FOR MANUFACTURING A PISTON FROM PLASTIC MATERIAL

[75] Inventor: Nabil Henein, Darmstadt, Germany

[73] Assignee: ITT Automotive Europe GmbH, Germany

[21] Appl. No.: 492,645

[22] Filed: Jun. 20, 1995

[30] Foreign Application Priority Data

Jun. 20, 1994 [DE] Germany .................. 44 21 566.5

[51] Int. Cl.⁶ .................. B29C 45/40; B29C 45/44; B29C 45/26
[52] U.S. Cl. .................. 425/556; 425/577; 425/438; 425/441; 425/443; 425/444; 425/468; 425/DIG. 10; 425/DIG. 58; 249/59; 249/67
[58] Field of Search .................. 249/59, 63, 64, 249/67; 425/577, 190, 556, 441, 443, 444, DIG. 58, DIG. 10, 468, 438

[56] References Cited

U.S. PATENT DOCUMENTS

| | | | |
|---|---|---|---|
| 3,843,088 | 10/1974 | McLoughlin et al. | 425/577 |
| 4,732,726 | 3/1988 | Grannen | 425/577 |
| 4,764,103 | 8/1988 | Mitake | 425/577 |
| 4,787,596 | 11/1988 | Folding et al. | 249/59 |
| 4,923,388 | 5/1990 | Nakamura | 425/577 |
| 5,038,455 | 8/1991 | Guest | 425/577 |
| 5,126,184 | 6/1992 | Yabe et al. | 425/577 |
| 5,387,389 | 2/1995 | Catalanotti et al. | 425/440 |
| 5,470,221 | 11/1995 | Gaiser | 425/577 |

FOREIGN PATENT DOCUMENTS 3816607  11/1989  Germany .

Primary Examiner—Khanh P. Nguyen
Attorney, Agent, or Firm—J. Gordon Lewis; Thomas N. Twomey

[57] ABSTRACT

An assembly for manufacturing a plastic piston using a first mold and a second mold, each mold having an axial recess, centering element, core element and contact face. The second mold is movable toward and away from the first mold and can be connected to the first mold using a transverse slide on the first mold and a holding apparatus.

11 Claims, 3 Drawing Sheets

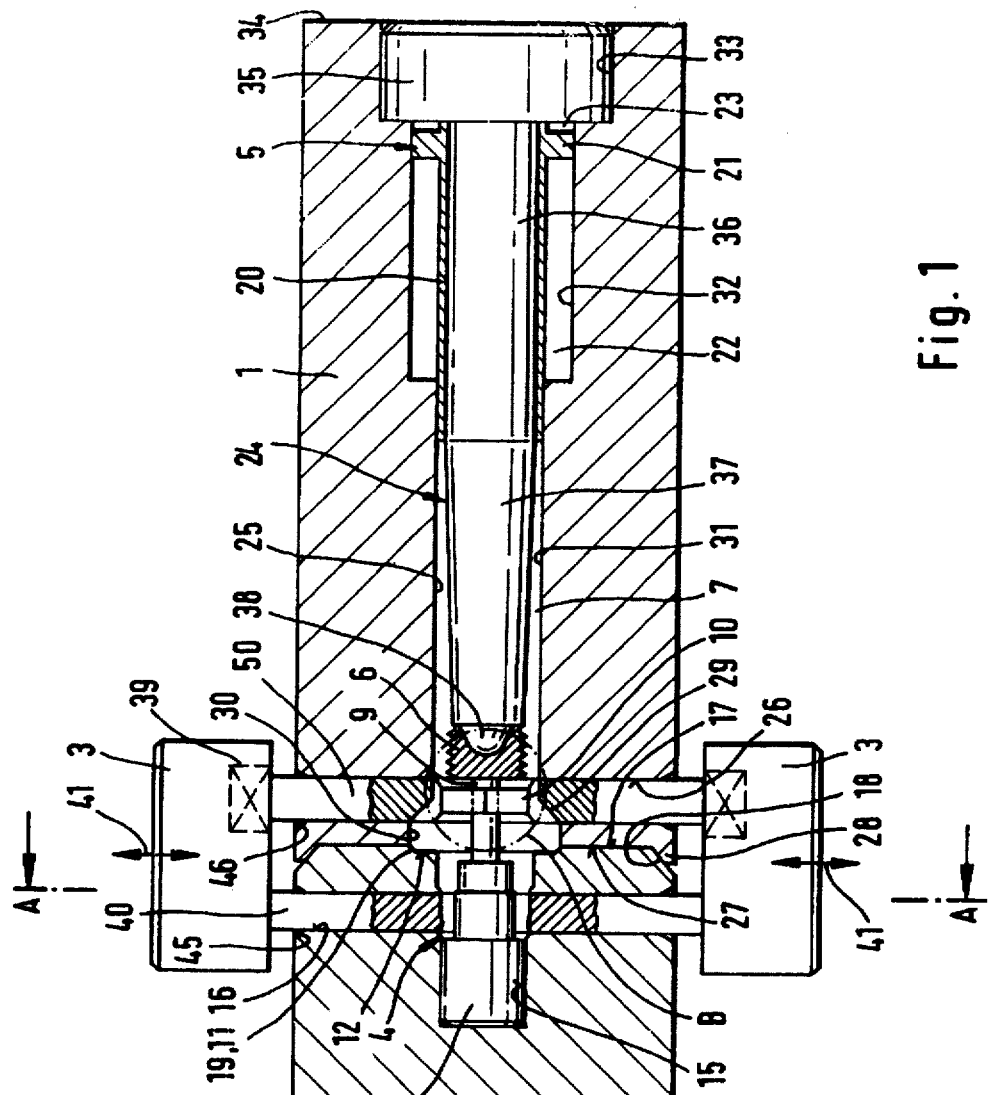
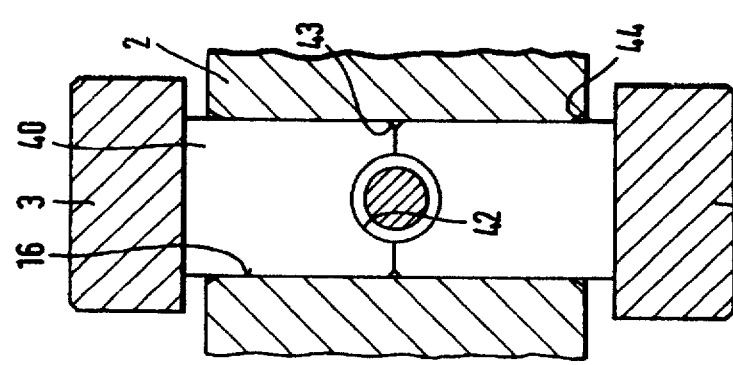

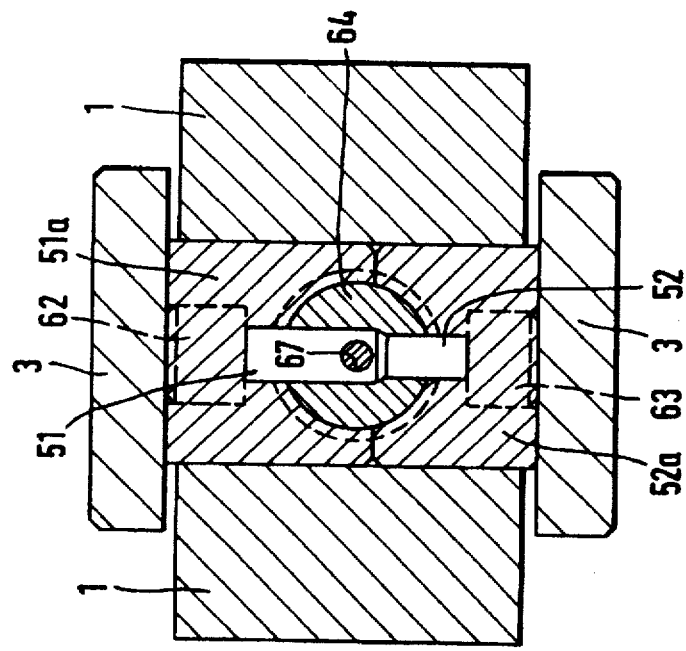
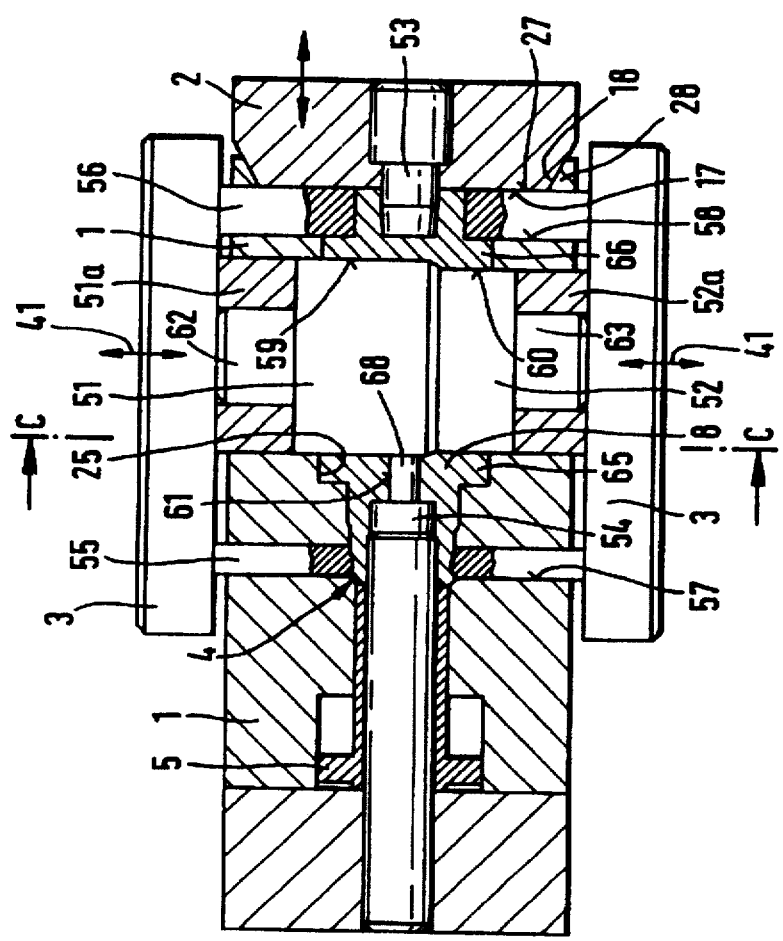
Fig. 5
Fig. 4

ASSEMBLY FOR MANUFACTURING A PISTON FROM PLASTIC MATERIAL

TECHNICAL FIELD

The present invention relates to a process and an assembly for the manufacture of a piston provided with radial recesses, and a piston produced according to such a process.

BACKGROUND OF THE INVENTION

DE-38 16 607 describes a process of manufacturing a piston-and-cylinder assembly wherein a core oriented in a direction coaxial with the piston axis is introduced into a die-casting mold conforming to the external shape of the piston, and wherein plastic material is injected into the cavity formed between the core and the die-casting molds whereafter the core is removed.

The disadvantage involved with this process resides in that it is not possible to make radial recesses during injection-molding of the piston because the provision of radial projections on the core would be required, and these radial projections would prevent the axial removal of the core. Radial recesses of the piston will, therefore, have to be made in subsequent processing steps.

Employing centrally divided molding elements which (relative to the piston) are moved in the radial direction so that they are likely to contain radial projections, involves the disadvantage that ridges are formed on the injection-molded piston at the joint between the said molding parts; such ridges will also have to be removed by after treatment.

Pistons having radial recesses are required, for example, in master cylinders for hydraulic brake actuators furnished with so-called central valves, with radially extending components, such as stop pins, used with the pistons.

It is the object of the present invention to provide a process according to which a piston including axial and radial recesses can be made of plastic material, the manufacture of which can be carried out by simple means, requiring no or only few steps of after treatment.

SUMMARY OF THE INVENTION

According to the invention a basic assembly is used which comprises an axial recess conforming to the outer shape of the piston to be manufactured. Hence, no axially extending separating joint exists and no axially extending ridges, projections or mold separating misalignments will occur on the piston. The recess can be of a stepped configuration. A core element arranged on the recess serves to form a recess in the core element. The ejector serves as a compressor piston for generating a hydraulic pressure within the injected mass (so-called pumps), involving the advantage that after completion of the injection operation the internal pressure of the injected mass is increased, thereby enhancing the molding accuracy. Moreover, the ejector serves to eject the completed piston.

The recess and the core element are so positioned in the basic assembly that the resultant cavity conforms to the mold of the piston to be manufactured.

The auxiliary assembly which is axially movable to the basic assembly and accurately positioned thereon, seals the cavity conforming to the shape of the piston; a radially circumferential joint is provided at the point of contact between the basic and auxiliary assemblies.

Transverse recesses are provided in the basic assembly and are arranged at an angle relative to the axial recess. Preferably, this is a right angle although also other angles inclined by 45° or 60° against the longitudinal axis can be used. Transverse slides are pushed into the transverse recesses, protruding into the cavity formed by the basic and auxiliary assemblies and mutually supporting themselves in the pushed-in condition. Hence, the transverse slides define the radial recesses of the piston to be manufactured. The mutual pair-wise support of the transverse slides one against the other prevents the transverse forces exerted by the transverse slides from being transferred to the basic and auxiliary assemblies thereby precluding that the accurate positioning of basic and auxiliary assemblies with respect to one another are affected by the insertion and positioning of the transverse slides.

After the cavity conforming to the piston having been defined by positioning the basic and main assemblies, molding core, ejector and transverse slides, plasticized resin is injected into the said cavity through injection nozzles and is subsequently cooled to a temperature below its plasticizing temperature. The plastic material is thus stable in shape; the transverse slides can be drawn out laterally and the auxiliary assembly can be axially removed from the basic assembly. After removal of the auxiliary assembly the piston by means of the ejector is axially ejected out of the basic assembly toward the auxiliary assembly.

If the auxiliary assembly is also provided with a recess which is positioned in coaxial relationship to the recess of the basic assembly, a circumferential ridge is likely to be formed on the piston to be manufactured which is easily removable if so required.

If it is desired to incorporate premanufactured components into the piston to be manufactured it is advisable to position the said components by means of a holding element provided on the auxiliary assembly within the afore-described cavity. During injection, the plastic material is sprayed around the component to be incorporated and in this way is integrated into the piston. For fixing the component to the piston in a stable manner, the surface of the component can be provided with projections, dishings or undercuts.

If the piston to be manufactured is used as the piston of a master cylinder of a hydraulic brake system it is advisable to make the piston of duroplast with suitable fillers and to form the component as a pressure piece composed of a stable and wear-resistant material, such as metal, integrating it into the piston. A piston rod serving to actuate the piston can be supported on the said pressure piece.

A component of this type, initially, can be arranged on the holding element in a manner relatively free; it can be accurately positioned only once the auxiliary assembly is moved toward the basic assembly. If the component part is the pressure piece, it can be placed into abutment with the molding core which with a corresponding shaping of the tip thereof, will insure a precise orientation of the pressure piece. An advantage involved with this measure resides in that no excessive care is required to provide the component to be incorporated on the holding element, thereby facilitating the sequence of operations and permitting an enhanced working speed.

The same advantages can be obtained if the accurate positioning of the component to be incorporated is effected only during insertion of the transverse slide, i.e. by supporting the component on the transverse slides.

If both the basic assembly and the auxiliary assembly are provided with transverse recesses extending in parallel with respect to one another into which can be inserted firmly interconnected transverse slides immovable in their relative position with respect to one another, this will also permit an accurate positioning of the basic and auxiliary assemblies with respect to one another. Because the distance between the slides engaging the basic assembly and the slides engaging the auxiliary assembly is precisely defined, such slides can be completely moved into the basic and auxiliary assemblies only if these assemblies take their prescribed relative position with respect to one another, it being possible for the transverse recesses and transverse slides, respectively, to be provided with truncated sections tapering toward the longitudinal axis of the piston and eliminating an axial play, if any, between the basic and auxiliary assemblies during insertion of the transverse slides. During insertion, the transverse movement of the slides is converted into a possibly required axial movement of the auxiliary and basic assemblies with respect to one another. Once the opposing transverse slides are supported on one another, no transverse force will any longer be exerted on the basic and auxiliary assemblies.

To carry out the afore-described process, an arrangement is suggested, consisting of a basic and an auxiliary assembly disposed displaceably with respect to one another, with the displacement means being provided vertically on the contact faces of the basic and auxiliary assemblies.

Provided in the basic assembly are an axial recess and transverse recesses oppositely arranged in pairs. The one end of the axial recess ends in the contact face of the basic assembly that can be placed in contact with the auxiliary assembly, while a core element and an ejector are provided on the other end of the axial recess.

The ejector is movable in the axial direction and serves to eject the piston toward the open end of the recess. The transverse recesses opposing in pairs accommodate the transverse slides supported on one another in pairs.

Provided on the contact face of the basic assembly are centering means cooperating with centering means provided on the contact face of the auxiliary assembly and permitting an accurate positioning of auxiliary and basic assemblies with respect to one another. The centering means can be in the form of bores, on the one hand, and pins, on the other hand, engaging the bores; also they can be truncated faces corresponding to one another, or any other suitable means.

If also the auxiliary assembly includes an axial recess, the latter, at the point of transition to the contact face of the auxiliary assembly, should be of the same radius as the axial recess of the basic assembly, with at least one of the said recesses being provided with a truncated face directly adjoining the corresponding contact face and tapering away therefrom. In case of an occurrence of ridges, such ridges would arise at the end of larger diameter of the truncated face. When using the piston to be manufactured in a master cylinder of a hydraulic brake system, a sealing cup is provided in the area of the piston formed by the axial recess to which damage could be done, during operation, by a ridge. In view of the provision of the truncated face, the ridge-free end of which adjoins the sealing cup, such a damage will be effectively prevented from occurring as the sealing cup, during operation, cannot reach the other end of the face.

Ridges, if any, can be removed either by a simple processing step or can be tolerated if they are smaller than the gap between piston and master cylinder bore. A complete prevention of the ridge is not required as the sealing cup cannot penetrate into the area of the ridge.

If the piston is made of plastic material with fillers they are likely to project from the surface during after treatment, thereby affecting the sealing cup. This, again, is precluded by the provision of the truncated surface, it being adequate for the said area to be of a small axial extension.

In order to enable axial or radial recesses to be provided also in the area of the piston formed in the auxiliary assembly a core element or transverse recesses can be provided in the auxiliary assembly of the type already described in respect of the basic assembly.

The piston can be readily removed from the basic assembly and the auxiliary assembly is easily removable from the basic assembly if the axial recesses are provided with tapering sections which can be of a truncated design; also cylindrical sections interconnected through steps can be used. In that case the resultant piston has its maximum radial extension only in one predetermined axial section while the other areas are of smaller diameters, adding to material savings and, hence, to a reduced weight of the piston.

The core elements can also comprise tapering sections involving identical advantages. If the core element forming the opening of the piston accommodating the piston rod, is provided with a truncated surface the piston rod can be arranged swivably relative to the axis of the piston which will facilitate assembly thereof in the automotive vehicle.

Moreover, the invention provides the ejector with a sleeve coaxially arranged about the core element and axially displaceable on the outer surface thereof or on the inner face of the recess of the basic assembly. Provided between the sleeve of the ejector and the resultant piston is only a relatively small contact face from which the pushed-out piston easily separates, while a larger contact face could result in adherence of the piston so that, after being pushed out, it would require to be separated from the ejector in an additional process step.

According to the invention, the transverse slides are held in holding elements arranged laterally of the basic and auxiliary assemblies, permitting all transverse slides to be simultaneously inserted, thereby facilitating the manufacturing process.

If the transverse slides are replaceably fixed within the holding elements, pistons provided with differently formed recesses can be manufactured by the same assembly. The assembly, hence, is adaptable to all required changes in the product. Easy replacement of the transverse slides also enables short-term changes in the product line with no extended periods of interruptions involved. This is particularly desirable in view of the just-in-time supply increasingly required these days.

It has proved to be reasonable, if several pairs of transverse slides are provided, not to secure one or several of such pairs to the holding means directly but rather to the assembly having then been moved out by means of a reset spring. Installing the working position is performed through toe-dogs provided on the holding means,thereby enabling basic and auxiliary assemblies to move apart, with the transverse slides not being completely moved out.

In order to enable components to be integrated into the piston to be arranged, a holding element is provided on the auxiliary assembly. Such a holding element can be provided, for example, on a molding body arranged within the auxiliary assembly. It may be in the form of a pin engaging a recess of the component.

A piston of plastic material produced according to the afore-described process comprises axial recesses and recesses arranged in transverse relationship thereto. Moreover it comprises a bevel arranged on a circumferential step and corresponding to the separating face of the auxiliary and basic assemblies. No after treatment of the said piston is required for providing the radial recesses and for removing of ridges.

Hence, the invention provides a piston involving low manufacturing costs, which is made of a weight-reducing material and which can be suitably used with a hydraulic brake system that, in particular, can also be furnished with central valves. The piston can be formed both as a floating piston and as a pressure rod-type piston of a tandem master cylinder; also, it can be used in the wheel cylinders of a brake assembly. In addition, regulator-type or brake pistons can be manufactured according to the process of the invention, involving low manufacturing costs.

BRIEF DESCRIPTION OF THE DRAWINGS

FIG. 1 shows an assembly for carrying out the process described with reference to a first form of embodiment illustrated in longitudinal section, FIG. 2 is a cross-sectional view of FIG. 1 along line A—A, FIG. 4 shows a longitudinal section of another form of embodiment, FIG. 5 is a cross-sectional view of FIG. 4 along line C—C.

DETAILED DESCRIPTION OF THE PREFERRED EMBODIMENT

Figure 3:
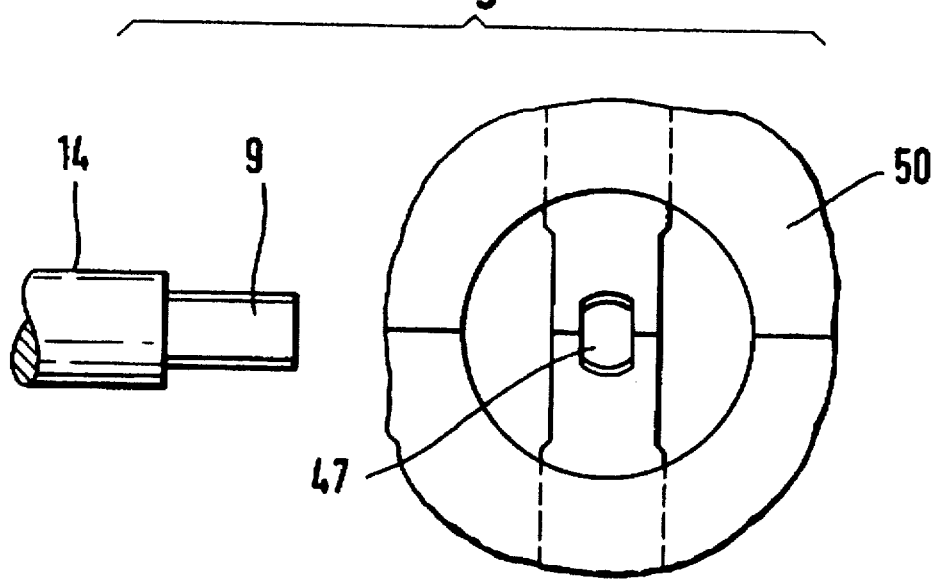
FIG. 3 is an enlarged view of cut B from FIG. 1 shown in longitudinal and cross-sections.

Referring to the drawings, FIG. 1 shows the basic assembly 1, the auxiliary assembly 2 and the holding elements 3. Provided in the auxiliary assembly 2 are injection nozzles 4 which, optionally, can also be separately arranged in an intermediate plate (not shown) provided on the auxiliary assembly 2. Moreover, an axial recess 15 is provided in the form of a blindhole bore 15 comprising several cylindrical sections of varying radii decreasing toward the end of the blindhole bore.

Secured to the end of the recess 15 is a core element 14 made up of a plurality of cylindrical areas of varying radii decreasing toward the opening of the recess 15, with the core element 14 extending beyond the opening of the recess 15 and terminating in a holding element 9 formed as a cylindrical pin of a small diameter.

A pressure piece 6 can be fixed to the said holding element 9, which pressure piece being a pre-fabricated component to be incorporated into the piston, initially, is secured to the holding element 9 to be then is fixed in its final position.

The pressure piece 6 can be made of a stable, especially wear-resistant material, such as metal or a high-stable resin.

Moreover, two transverse recesses 16 oppositely arranged in pairs are provided in the auxiliary assembly.

The auxiliary assembly 2, in addition, includes a contact face 17, with the open end of the recess 15 terminating therein. Provided on the outer edge of the contact face 17 is a circumferential slope 18 acting as a centering means forming a truncated face. Arranged on the end of the recess 15 is a circumferential step 12 which, through a truncated face 19, passes into the contact face 17. Some minor ridge formation can occur on the contact face 17 once the auxiliary assembly 2 and the basic assembly 1 show signs of wear. However, such ridges can only occur on the end facing the piston face 17, of the bevel 11 formed by the truncated face 19 and not on the point of transition of bevel 11 to step 12. During operation of the piston, a sealing cup (not shown) is in abutment with that point which is thus protected against wear caused by a contact with ridge sections.

The basic assembly 1 includes a contact face 27 which at the outer edge thereof is provided with a circumferential bead 28 the inner face of which is of a truncated design and is in cooperation with the circumferential slope 18 of the contact face 17 of the auxiliary assembly 2 in order to center basic assembly 1 and auxiliary assembly 2 with respect to one another.

Moreover, provided in the basic assembly 1 is an axial recess 25 formed as a cylindrical bore having four cylindrical sections 30,31,32,33. The cylindrical section 30 adjoins the contact face 27 and passes into a truncated section 29 terminating in the cylindrical section 31 being of a smaller diameter than the section 30. The cylindrical sections 32 and 33 adjoining the section 31 are each of a larger diameter; section 33 passes into an opening terminating in a limitation 34 of the basic assembly 1 opposite the contact face 27.

Secured by means of a fastening section 35 within the cylindrical section 33 is a core element 24. The fastening section 35 is adjoined by a cylinder 36, a truncated section 37 and a rounded cone 38. The rounded cone 38 serves to center the pressure piece 6 which is moved with the auxiliary assembly 2 toward the basic assembly and, hence, toward the core element 24.

In the area of the cylinder 36, the ejector 5 is shown in its retracted position. The ejector 5 is formed of a sleeve 20 and an annular piston 21 arranged on the side of the said sleeve 20 facing away from the contact face 27.

A working chamber 22 is confined by the cylindrical section 32 and the annular piston 21, while a working chamber 23 is provided on the other side of the annular piston 21. For moving out the piston, pressure fluid is applied to the working chamber so that the annular piston 21 and, hence, the sleeve 20, are moved to the left (as viewed in the Figure). By applying pressure fluid to the working chamber 22, the ejector 5 can be restored to the initial position.

Cylindrical transverse recesses 26 terminate in the area of the truncated face 29. Transverse slides 40 and 50, respectively, engage the transverse recesses 16 and 26, respectively. One transverse slide 40 and one transverse slide 50 each are secured within a holding element 3 and are fixed immovably with respect to one another. The transverse slides 40,50 are oriented in parallel with respect to one another and are at right angles relative to the longitudinal axis of the axial recesses 15 and 25, respectively. The holding elements 3 are displaceable in the direction of the longitudinal axes of the transverse slides 40 and 50, respectively, as shown by arrows 41. In the retracted condition the transverse slides 40 and 50, respectively, define an area of smaller diameter than that of the adjoining sections of the bores 15 and 25, respectively.

The transverse slides 50 are secured within the holding element 3, for example, by means of a thread 39 so that they can be separated from the holding element 3 in a relatively easy way to be replaced by transverse slides 50 having different dimensions in the area of the piston.

FIG. 2 shows a cross-sectional view of FIG. 1 along the line A—A, illustrating the transverse slides 40 secured to the holding element 3 and guided in the transverse recess 16 of the auxiliary assembly 2. The transverse slides 40 essentially are of a rectangular cross-section and at the end thereof opposite the holding means 3 are furnished with a semicircular arc 42. Such arcs 42 define a part of the cavity in which the piston 7 is formed.

Provided on the front-sided circumference of the transverse slides 40 are bevelled edges 43 cooperating with corresponding slopes 44 of the auxiliary assembly 2 when the transverse slides 40 are pushed into the transverse recesses 16, centering the same accurately.

Corresponding bevels 45 and 46 provided in the auxiliary assembly 2 and the basic assembly 1, respectively, and extending in a direction vertical to the bevels 44 are also shown in FIG. 1. They also function to center the transverse slides 40 and 50, the basic assembly 1, and the auxiliary assembly 2 relative to one another.

The left-hand part of FIG. 3 shows a longitudinal section of the holding member 9 of the core element 14, while the right-hand part shows a cross-sectional view of the opening 47 in the transverse slide 50. The opening 47 precisely covers the area of the core element 14 adjoining the holding element 9 so that no plastic material can penetrate between the core element 14 and the transverse slide 50.

The piston manufactured by means of the assembly illustrated in FIGS. 1 to 3 conforms to the shape of the cavity confined by the individual components, with the individual areas being explained hereinafter as follows.

The part of the piston 7 disposed in the area of the cylindrical section 31 forms the piston shaft in the interior of which is guided a piston rod serving for actuating the piston 7 and being supported on the pressure piece 6. The pressure piece 6, laterally, is provided with a fluted surface establishing a form- and force-locked contact with the piston 7.

The part of the piston 7 disposed in the cylindrical section 30 and being of the largest radius forms the actual piston cooperating with the internal wall of a cylinder, with the piston 7 being inserted thereinto. The section of the piston 7 provided in the cylindrical area 30 as shown to the left of the depict, serves for accommodating a sealing cup sealing a pressure chamber formed by the piston and cylinder. The recess formed by the core element 14 serves for accommodating a central valve as taught, for example, by DE 40 40 271. A stop pin can be guided through the transverse recess 10 of the piston 7, which stop pin can be struck by an actuating element for opening the central valve. The stop pin can contact the pressure piece 6 directly, thereby preventing wear of the plastic material from occurring.

To manufacture the piston 7 according to the former example of embodiment, the following process steps are carried out:

1) in the basic assembly 1, the ejector 5 is placed into its retracted position, thereby causing the components provided in the basic assembly 1 to take their working position,
2) the pressure piece 6 is placed on the holding element 9 of the auxiliary assembly 2,
3) the auxiliary assembly 2 is moved to the basic assembly 1, with the two assemblies accurately positioning themselves with respect to one another through cooperation of the contact faces 17,27 and of the circumferential slope 18 and the circumferential bead 28, while the accurate position of the pressure piece 6 being attained by abutment with the rounded cone 38,
4) the holding elements 3 are moved toward one another, i.e. the transverse slides 40,50 are moved into the transverse recesses 16,26, with the basic and auxiliary assemblies 1,2 being again accurately oriented with respect to one another and the pairs of transverse slides 40 and 50, respectively, mutually supporting themselves in the transverse direction,
5) plasticized resin is injected through injection nozzles 4 into the cavity formed by the prescribed components and subsequently is allowed to cool to a temperature below the plasticizing temperature thereof,
6) after solidification of the piston 7, the transverse slides 40,50 are laterally drawn out and the auxiliary assembly 2 is removed from the basic assembly,
7) the piston 7 is ejected from the basic assembly 1 by means of the ejector 5.

Subsequently, the same cycle can be repeated for manufacturing another piston.

Alternatively, the pressure piece 6 can be provided on the core element 24 and can be forced thereto by means of the holding element 9 when the two assemblies 1,2 are moved together. To insure that the cavity is fully filled with plastic material a vacuum is initially generated on the side of the ejector 5, thereby causing the cavity to be completely filled with plasticized resin. Subsequently, a hydraulic pressure can be exerted on the plastic material by displacing the ejector to the left, thereby causing the resin to completely penetrate into all cavities to be filled.

The second form of embodiment as shown in FIG. 4 is an assembly for manufacturing a floating piston for a tandem master cylinder of a hydraulic brake assembly, with the piston 8 comprising an axially extending, elongated, radial recess 60 formed by corresponding elongated transverse slides 51,52 comprising cross-sectional faces of different sizes extending in a direction vertical to the plane shown in FIG. 4. Moreover, the elongated transverse slide 51 extends beyond the longitudinal axis of the piston 8, while the elongated transverse slide 52 is designed correspondingly shorter.

The wider area of recess 60 which, in the drawing of FIG. 4, is arranged at the top, insures a safe liquid connection between that area and a bore 61 of the piston 8. In the piston 8 mounted in a tandem master cylinder, a stop pin is provided in the recess 60, with the said stop pin actuating an actuating element led through the bore 61, of a centering valve accommodated in the left-hand area of the piston 8. The said area is formed by a core element 54 connected to the basic assembly 1 and surrounded by an ejector 5 as described in connection with FIG. 5.

The auxiliary assembly 2 in that case is not provided with a recess but only with a core element 53 protruding beyond the contact face 17 into the basic assembly 1. Moreover, a circumferential sloping 18 is provided on the auxiliary assembly 2 cooperating with a circumferential bead 28 of the basic assembly 1 for centering the basic and auxiliary assemblies with respect to one another.

Additional transverse slides 55 and 56 conforming in shape to the transverse slides 40 are provided in the transverse recesses 57 and 58 and, in the piston 8, define areas of smaller diameter. The transverse slides 51 and 52 engage the transverse recesses 59,60. It is also in that form of embodiment that injection nozzles 4 and holding elements 3 are provided in which are fixed the transverse slides 51 and 52 and 55,56, respectively (arrow 41 refers to the direction of movement of the holding element 3).

FIG. 5 shows a cross-section of FIG. 1 in the area along C—C. As shown, the elongated transverse slides 51,52 by means of mounting sections 62,63 are arranged in external transverse slides 51,52a secured to the holding elements 3. The section 64 of the piston 8 formed in that area is of a smaller diameter than the adjoining sections 65 and 66

(shown in broken lines) so that ridge formations, if any, have no adverse effect on the operation of the piston 8.

Provided in the transverse slide 51 is an axial bore 67 for accommodating a pin 68 arranged on the front end of the core element 54, which pin 68 defines the bore 61 in the piston 8 to be manufactured.

Figure 6:
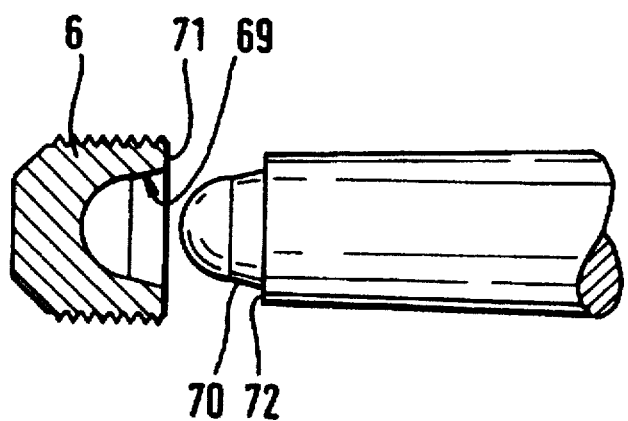
FIG. 6 shows an alternative embodiment of a pressure piece according to FIG. 1.

FIG. 6 shows a pressure piece 6 provided with a slightly conical centering face 69 cooperating with a correspondingly formed centering face 70 of the core element 24 to center the pressure piece 6 on the core element 24. The holding element 9 forces the pressure piece 6 against the core element 24, with the auxiliary assembly 2 moved to the basic assembly 1. The core element 24 with an annular face 71 is then in abutment with a corresponding face 72 of the core element 24, with no cavities existing between the annular faces 71 and 72 or between the centering faces 69 and 70 into which resinous material could be injected.

I claim:

1. An assembly for manufacturing pistons, comprising:
   a first mold having a first axial recess;
   said first axial recess having a first core element and an ejector located therein, said first axial recess being open toward a first contact face on said first mold;
   said first mold also having at least a first transverse recess oriented generally perpendicularly to said axial recess;
   a first centering element located on said first mold generally perpendicularly with respect to said first transverse recess; and
   a second mold movable toward and away from said first mold and having a second contact face and a second centering element; wherein
   said first and second molds are connected together by at least one transverse slide located in said first transverse recess and connected to said second mold by a holding apparatus.

2. An assembly according to claim 1, wherein said second mold is provided with a second axial recess having at least one diameter equal to a diameter of said first axial recess.

3. An assembly according to claim 2, wherein at least one of said first and second axial recesses includes a truncated face portion located adjacent to, and tapering away from, a corresponding contact face.

4. An assembly according to claim 1, further including a second core element provided in said second mold.

5. An assembly according to claim 1, wherein said holding apparatus comprises at least one second transverse recess in said second mold for receiving a second transverse slide and a holding element for connecting said first and second transverse slides.

6. An assembly according to claim 5, wherein said first and second transverse slides are secured within said holding element, said holding element being arranged laterally of said first and second molds.

7. An assembly according to claim 5, wherein said first and second transverse slides are replaceably secured within said holding element.

8. An assembly according to claim 5, wherein said second mold includes at least two second transverse recesses.

9. An assembly according to claim 5, wherein said holding element is provided on said second mold.

10. An assembly according to claim 1, wherein one of said first axial recess and said second axial recess comprises a tapering section.

11. An assembly according to claim 1, wherein the ejector includes a sleeve having an inner surface and an outer surface;
    said sleeve outer surface being displaceable in abutting relationship with an inner surface of said first axial recess; and
    said sleeve inner surface being displaceable in abutting relationship with an outer surface of said first core element.

* * * * *